(12) United States Patent
Nakayama

(10) Patent No.: US 8,025,311 B2
(45) Date of Patent: Sep. 27, 2011

(54) AIR-BAG

(75) Inventor: Kazuhiro Nakayama, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/654,007

(22) Filed: Dec. 8, 2009

(65) Prior Publication Data
US 2010/0164212 A1 Jul. 1, 2010

(30) Foreign Application Priority Data
Dec. 25, 2008 (JP) .................................. 2008-329706

(51) Int. Cl.
*B60R 21/16* (2006.01)
(52) U.S. Cl. .................................. 280/743.2; 280/730.1
(58) Field of Classification Search ............... 280/743.2, 280/730.1
See application file for complete search history.

(56) References Cited

U.S. PATENT DOCUMENTS

| | | | | |
|---|---|---|---|---|
| 7,600,784 B2 * | 10/2009 | Kashiwagi | ................ | 280/743.2 |
| 2003/0184069 A1 | 10/2003 | Takimoto et al. | | |
| 2007/0045998 A1 * | 3/2007 | Kashiwagi | ................ | 280/730.1 |
| 2007/0090632 A1 * | 4/2007 | Kashiwagi | ................ | 280/730.1 |

FOREIGN PATENT DOCUMENTS

JP        A-2002-012111        1/2002

* cited by examiner

*Primary Examiner* — Faye M. Fleming
(74) *Attorney, Agent, or Firm* — Posz Law Group, PLC

(57) ABSTRACT

An air-bag comprising: a circumferential wall including facing wall portions which define a free inflation portion in which a distance between the facing wall portions is not controlled and a distance controlled portion in which a distance between the facing wall portions is controlled; and a tether including two edges on each of which a seam margin is provided, both seam margins has a linear stitch which joins the seam margin with the corresponding facing wall portion and controls a distance between the facing wall portions of the distance controlled portion, and at least one of the seam margins has a curved stitch which is continued from an end of the liner stitch and provided at least at one end of the seam margin. The curved stitch forms a gradually expanding portion between the free inflation portion and the distance controlled portion, which gradually expands in an outward direction perpendicular to the facing wall portions.

6 Claims, 10 Drawing Sheets

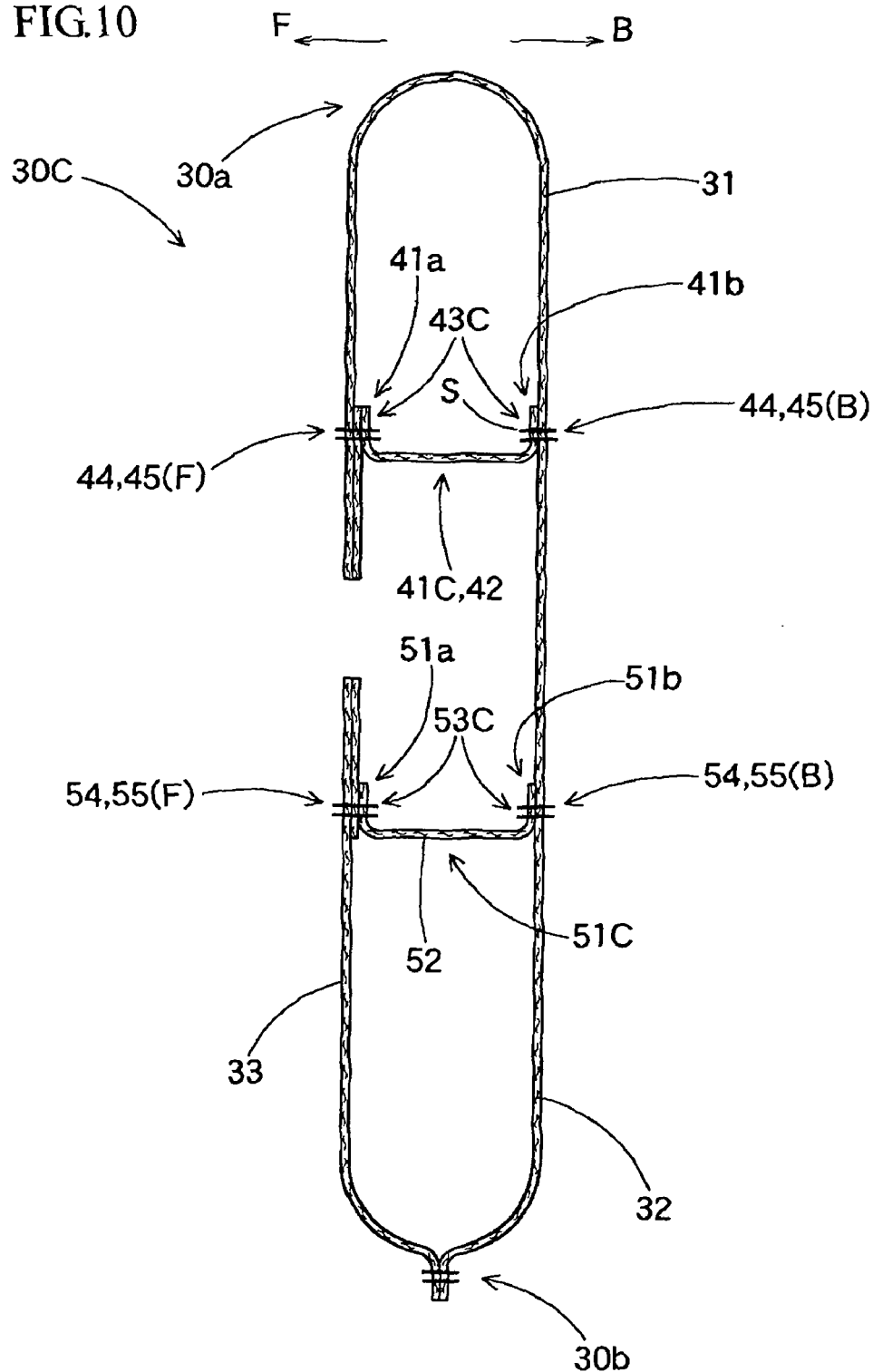

AIR-BAG

CROSS-REFERENCE TO RELATED APPLICATIONS

This application claims priority from Japanese Patent Application No. 2008-329706 filed on Dec. 25, 2008, the entire subject matters of which are incorporated herein by reference.

TECHNICAL FIELD

The present invention relates to an air-bag used in an air-bag system which is installed in a vehicle and is inflated by an inflow inflation gas when the air-bag system is activated. More particularly, the present invention relates to an air-bag which has tethers connecting facing wall portions of a circumferential wall so as to control a mutual distance between the facing wall portions when the air-bag completes its inflation.

BRIEF DESCRIPTION OF THE RELATED ART

As a related air-bag of this type, there has been proposed a knee protection air-bag. This knee protection air-bag is inflated into a substantially rectangular plate-like shape. In this inflated condition, the knee air-bag includes a circumferential wall having an opposed wall. The opposed wall includes two walls which face each other when the air-bag completes its inflation. The one of the opposed wall is referred to as a knee side wall which lies on a side of the circumferential wall where the knees of the occupant are received, and the other opposed wall is referred to as a body side wall portion which lies on the body side such as a column cover (for example, refer to JP-A-2003-291769 and JP-A-112371). The thickness of the air-bag is controlled by tethers so that the plate-like shape can be maintained which can easily be installed in a narrow space between the knees and the vehicle body when the air-bag completes its inflation. In the tether, a rectilinear stitche the tethers to the air-bag along straight lines which are parallel to each other on both edges of the tether. Thus both the edges of the tether which face each other in a thickness direction when the air-bag is inflated are stitched, respectively, to the knee side wall portion and the body side wall portion which face each other.

In some air-bag for a driver, a body side wall portion and a driver's side wall portion of the air-bag which face each other are connected together by tethers so that the air-bag is inflated into a substantially ellipsoidal shape so as to prevent the air-bag from projecting into a spherical shape towards the driver's side (for example, refer to JP-A-2002-12111). In this air-bag, however, both edges of the tethers are respectively stitched to the body side wall and the driver's side wall which face each other only along curvilinear stitch where the tether is stitched to the air-bag into an arc-like shape along a circumferential direction of an inflation gas inlet port of the air-bag about the inflation gas inlet port, and no rectilinear stitches are provided.

In the related air-bags, however, in a case where the tethers are stitched to the opposed walls (the knee side wall and the body side wall) which face each other by providing the linear stitches on the tethers so that the distance between the knee side wall and the body side wall which face each other is kept constant, when a drastic increase in internal pressure resulting from the inflation of the air-bag occurs, a stress concentration easily takes place at end portions of the linear stitches. Because of this, in JP-A-2003-291769, in order not to call for failure of the facing wall portions and break of stitching threads in the vicinity of the linear stitches, reinforcement fabrics are thickly superposed. Alternatively, terminating ends of stitching threads are stitched reversely in a ring-like fashion, or terminating ends of stitching threads are formed into semi-circular shapes so as to be stitched reversely to form double stitching lines, and the terminating ends so reversed are then stitched reversely. Thus, stitching the tethers takes many labor hours.

SUMMARY

The invention has been made with a view to solving the problem, and an object thereof is to provide an air-bag which can mitigate the concentration of stress at end portions of linear stitches of tethers when the air-bag is inflated.

An air-bag according to an aspect of the invention includes a circumferential wall including facing wall portions which define a free inflation portion in which a distance between the facing wall portions is not controlled and a distance controlled portion in which a distance between the facing wall portions is controlled; and a tether including two edges on each of which a seam margin is provided, both seam margins has a linear stitch which joins the seam margin with the corresponding facing wall portion and controls a distance between the facing wall portions of the distance controlled portion, and at least one of the seam margins has a curved stitch which is continued from an end of the liner stitch and provided at least at one end of the seam margin. The curved stitch forms a gradually expanding portion between the free inflation portion and the distance controlled portion, which gradually expands in an outward direction perpendicular to the facing wall portions.

In the air-bag according to the invention, even though stress concentration is attempted to be generated at the end portions of the linear stitches when the air-bag is inflated, the curved stitches are provided with the stitching threads stretched thereto at the seam margins of the tethers at the end portions of the linear stitches. These curved stitches are stitched to the facing wall portions in the shape which is bent from the end portion of the linear stitches so as to gradually increase the mutual distances between the facing wall portions on the side where the curved stitches extend to move away from the linear stitches. Because of this, even though stress concentration is attempted to be generated at the end portions of the linear stitches, the stress acting on the stitching threads at the curved stitches, the seam margins of the tethers and the facing wall portions is dispersed to be mitigated by the shapes thereof in which the curved stitches are stitched to the facing wall portions while being bent to expand, thereby making it possible to prevent the generation of break or failure in the curved stitches.

These curved stitches can be formed simply by providing the seam margins on the tethers so as to extend from the end portions of the linear stitches towards the sides where the curved stitches move away from the linear stitches and stitching the seam margins while being bent with the seam margins stretched from the linear stitches to the curved stitches, whereby the stitching work can be facilitated.

Consequently, with the air-bag according to the invention, even though the stitching work of the tethers is made simple and easy, the stress concentration on the end portions of the linear stitches can be mitigated which occurs when the air-bag is inflated.

The curved stitches may be provided with the seam portions of the tethers stitched to the facing wall portions while securing a dimension length which can prevent the untying of the stitching threads to the end portions of the linear stitches when the air-bag is inflated and terminating ends of the stitching threads on the sides where the curved stitches extend to move away from the linear stitches not reversed but kept unknotted. In this configuration, even though stress concentration is attempted to be generated at the end portions of the linear stitches when the air-bag is inflated, the stitching threads at the curved stitches are untied to be untangled from the unknotted terminating ends where no reverse stitching is implemented through the seam margins of the tethers and the facing wall portions, whereby stress like those which call for breaks or failures is not exerted on not only the stitching threads at the portions at the end portions of the linear stitches but also the end portions of the seam margins of the tethers which lie at the portions of the linear stitches and the facing wall portions. Further, the stitching threads are not reversed but are simply cut to be kept unknotted at the curved stitches and this facilitates the stitching work further. Of course, as this occurs, the length dimension is set at the curved stitches so as to prevent the untying of the stitching threads to the end portions of the linear stitches and the mutual distances between the facing wall portions which the tethers face can be maintained constant by the linear stitches.

Although the curved stitches may be expanded in a tapered fashion from the end portions of the linear stitches, in a case where the curved stitches are provided so as to extend while being bent in an arc-like shape, the curved stitches are allowed to be bent into a curve gradually from the end portions of the linear stitches towards the sides where the curved stitches move away from the linear stitches, and the stress concentration generated when the air-bag is inflated is made difficult to be exerted partially also on the respective portions of the curved stitches themselves, whereby the stress attempting to act on the end portions of the linear stitches can be mitigated by the whole of the arc-shaped curved stitches which are stretched to the end portions of the linear stitches, and the break or failure of the stitching threads at the end portions of the linear stitches, the seam margins of the tethers and the facing wall portions can be prevented which would otherwise occur when the air-bag is inflated.

In a case where the air-bag includes a free inflation portion of the air-bag where the facing wall portions are spaced apart from each other also at the other end portions of the linear stitches to which the curved stitches are stretched, the curved stitches are provided on the other end portions of the linear stitches to which the curved stitches are stretched, whereby with the curved stitches provided thereon, both ends of at least one edge sides of both the edges of the tethers may be stitched to the facing wall portions.

Further, in a case where the air-bag includes a free inflation portion also on the other edge sides of both the edges of the tethers, expanded stitches may be provided also on the other edge sides of both the edges of the tethers.

Furthermore, it is desirable to apply a double stitching to the linear stitches and the curved stitches in which stitching threads are stitched substantially parallel to each other along the facing wall portions. In this configuration, even though one of the stitching threads in double stitching is broken, the other stitching thread can control the mutual distance between the facing wall portions, thereby making it possible to maintain the distances stably. In addition, the seam margins of the tethers and the facing wall portions are made integrally into a plate-like shape by the double stitching, whereby the stitching strength can be increased without increasing the tensile strength of the stitching thread itself.

BRIEF DESCRIPTION OF THE DRAWINGS

FIG. 10 A vertical sectional view of the air-bag shown in FIG. 9, which corresponds to a portion taken along the line X-X in FIG. 9.

DETAIL DESCRIPTION OF EXEMPLARY EMBODIMENTS OF THE PRESENT INVENTION

Figure 1:
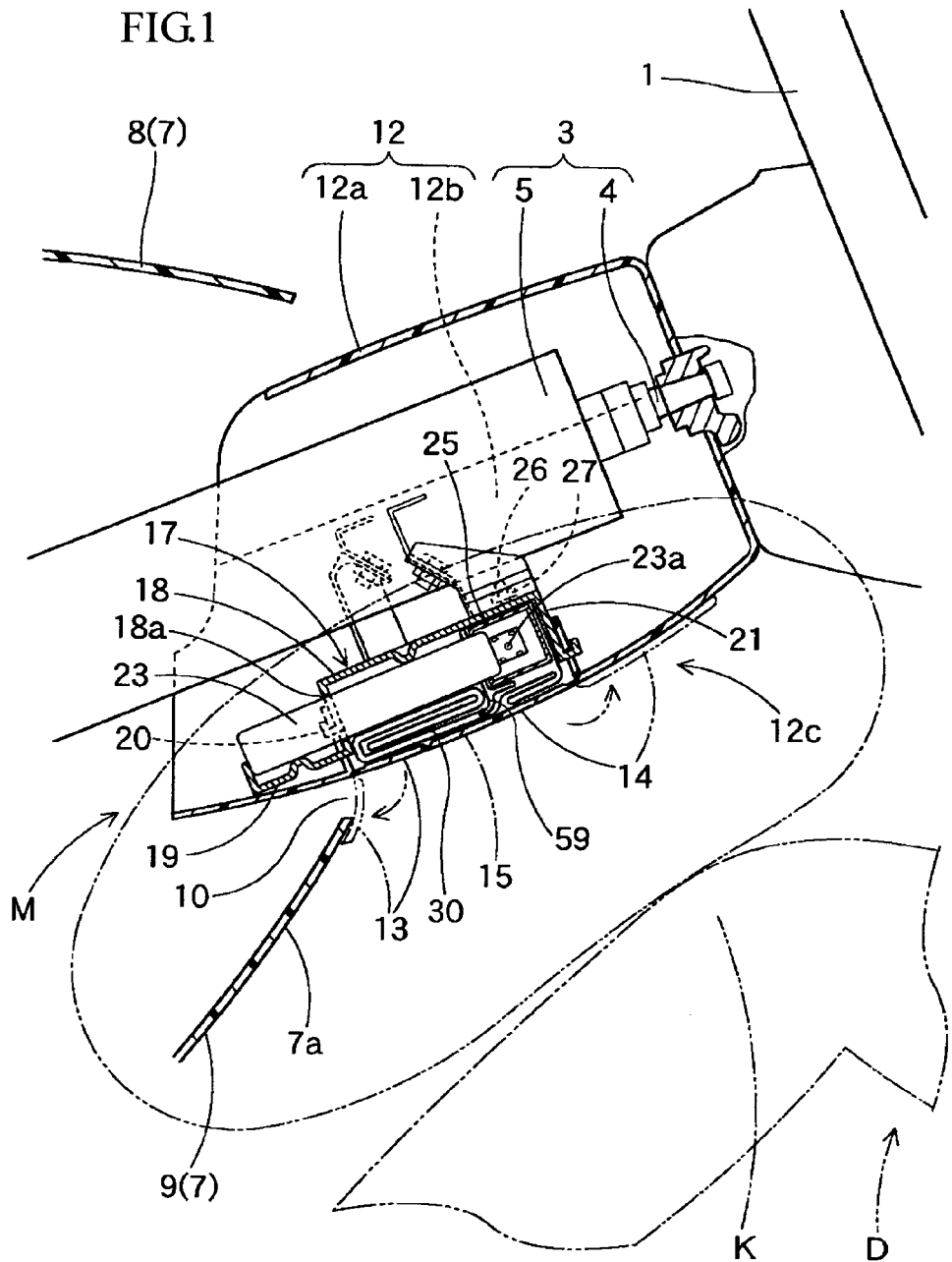
FIG. 1 A schematic vertical sectional view of a peripheral portion of a steering column where to install an air-bag system employing an air-bag of an embodiment according to the invention.

Hereinafter, an embodiment of the invention will be described based on the drawings. An air-bag system M of the exemplary embodiment is shown in FIG. 1. The air-bag system M includes an air-bag 30 which is inflated by allowing an inflation gas to flow thereinto, an inflator 23 for supplying the inflation gas to the air-bag 30, a case 17 for holding the air-bag 30 and the inflator 23, a retainer 25 for mounting the air-bag 30 and the inflator 23 on the case 17, and the column cover 12 which includes door portions 13, 14 which open when the air-bag 30 is inflated. The air-bag system M is a knee projection air-bag system, and is installed in a steering column 3 of a vehicle. The air-bag 30 is folded and accommodated on a lower portion 12c side within the column cover 12. When inflated, the air-bag 30 push-opens the door portions 13, 14 in the column cover 12 and deploys to inflate downwards from the lower portion 12c side of the column cover 12 so as to be disposed in front of the left and right knees of a driver D who is seated.

Note that when used in this specification, vertical, front-rear or longitudinal, and left-right or transverse directions correspond, respectively, to vertical, front-rear or longitudinal, and left-right or transverse directions of the vehicle when it travels forwards, unless otherwise denoted.

As is shown in FIG. 1, the column cover 12 has a substantially quadrangular tube shape, is made of a resin and includes an upper cover portion 12a and a lower cover portion 12b which are divided vertically. The column cover 12 is mounted on a column tube 5 of the steering column 3 via the case 17 and the like of the air-bag system M so as to project rearwards from an accommodation opening 10 in an instrument panel 7 so as to be disposed in front of the driver D. The steering column 3 includes a main shaft 4 and the column tube 5 which is disposed on the periphery of the main shaft 4, and a steering wheel 1 is connected to the main shaft 4. The instrument panel 7 is made up of an upper panel 8 lying on an upper side and a lower panel 9 lying on a lower side.

The door portions 13, 14, which are push-opened to both front and rear sides by the air-bag 30, are installed in the column cover 12 on the lower portion 12c side thereof so as to form one projection opening 15 from which the air-bag 30 projects when it is deployed. The door portions 13, 14 are installed in the lower cover portion 12b in the vicinity of a longitudinal center thereof.

The case 17 is made of a metallic plate having an inverted U-shape in section and includes a ceiling wall portion 18 and side walls 20, 21 which extend downwards, respectively, from front and rear sides of the ceiling wall 18, and a plurality of brackets (whose reference number is omitted) for fixing the air-bag system M to the column tube 5 are provided on the ceiling wall portion 18. The ceiling wall 18 has a mounting seat 19 which extends downwards from the vicinity of a front edge 18a and then extends forwards. The mounting seat 19 holds the inflator 23 in cooperation with the retainer 25. Locking hooks (whose reference numeral is omitted) are provided on the front and downwardly extending walls 20, 21 for locking the vicinities of the front and rear edges of the projection opening 15 which lies on the lower portion 12c side of the column cover 12.

The inflator 23 has a cylindrical shape and includes gas discharge ports 23a for discharging the inflation gas therefrom which are provided at a distal end side of the inflator 23 which is inserted into an interior of the air-bag 30.

The retainer 25 is made of a quadrangular tube shape metal plate which includes openings at both ends thereof in a transverse direction and includes a plurality of (two in this embodiment) bolts 26 which project upwards. In such a state that the retainer 25 is inserted into the interior of the air-bag 30, the gas discharge port 23a side of the inflator 23 is inserted into the retainer 25, and the bolts 26 are fastened to the ceiling wall portion 18 of the case 17 with nuts 27, whereby the air-bag 30 and the inflator 23 are mounted on and fixed to the ceiling wall portion 18 of the case 17. When the retainer 25 into which with the gas discharge port 23a side of the inflator 23 inserted is fastened to the case 17 with the nuts 27, the inflator 23 is pressed against a mounting seat 19 based on the principle of lever in which the front edge 18a of the ceiling wall portion 18 functions as a fulcrum to thereby be fixedly mounted on the case 17.

Figure 2:
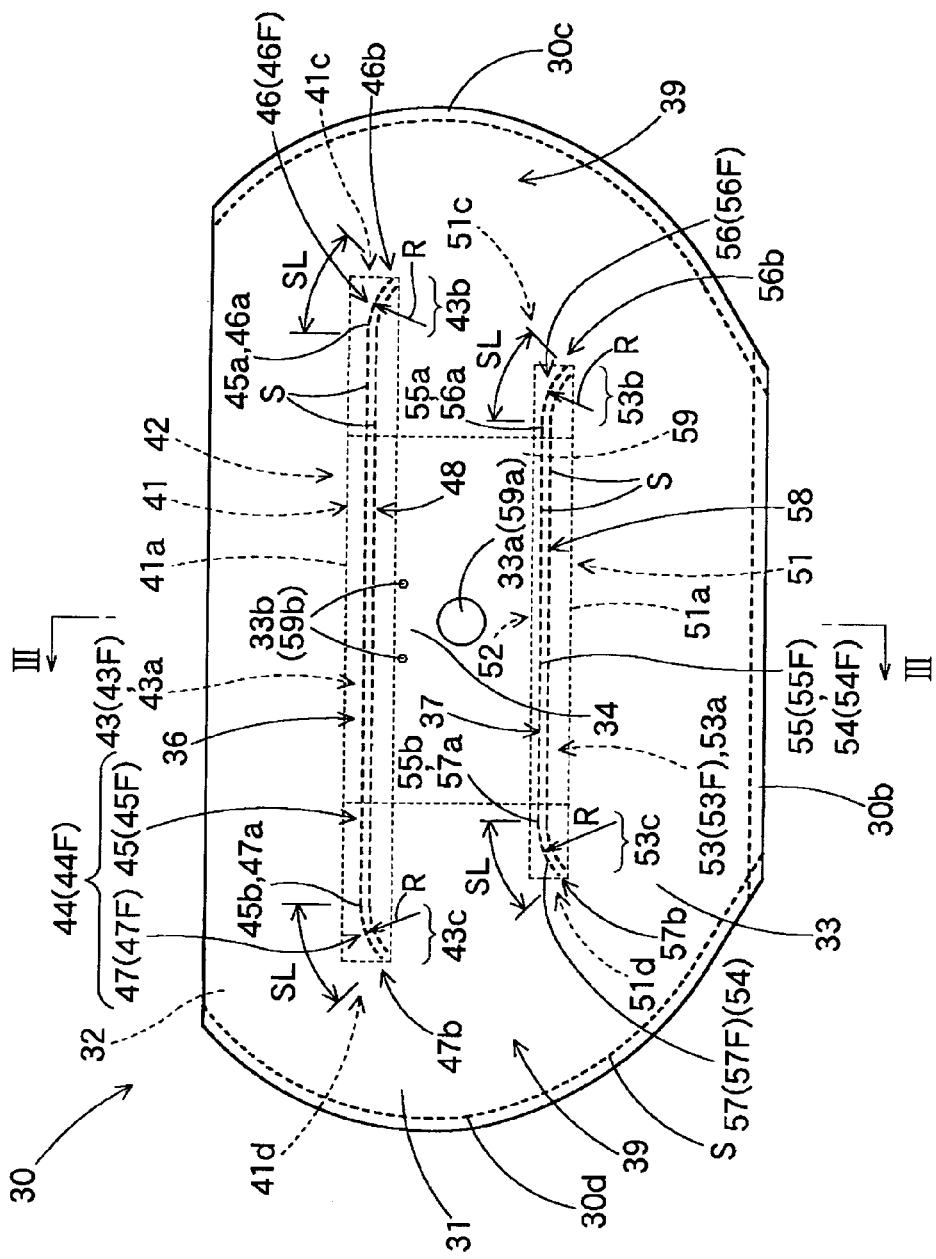
FIG. 2 A view of the air-bag of the embodiment seen from the front.
Figure 3:
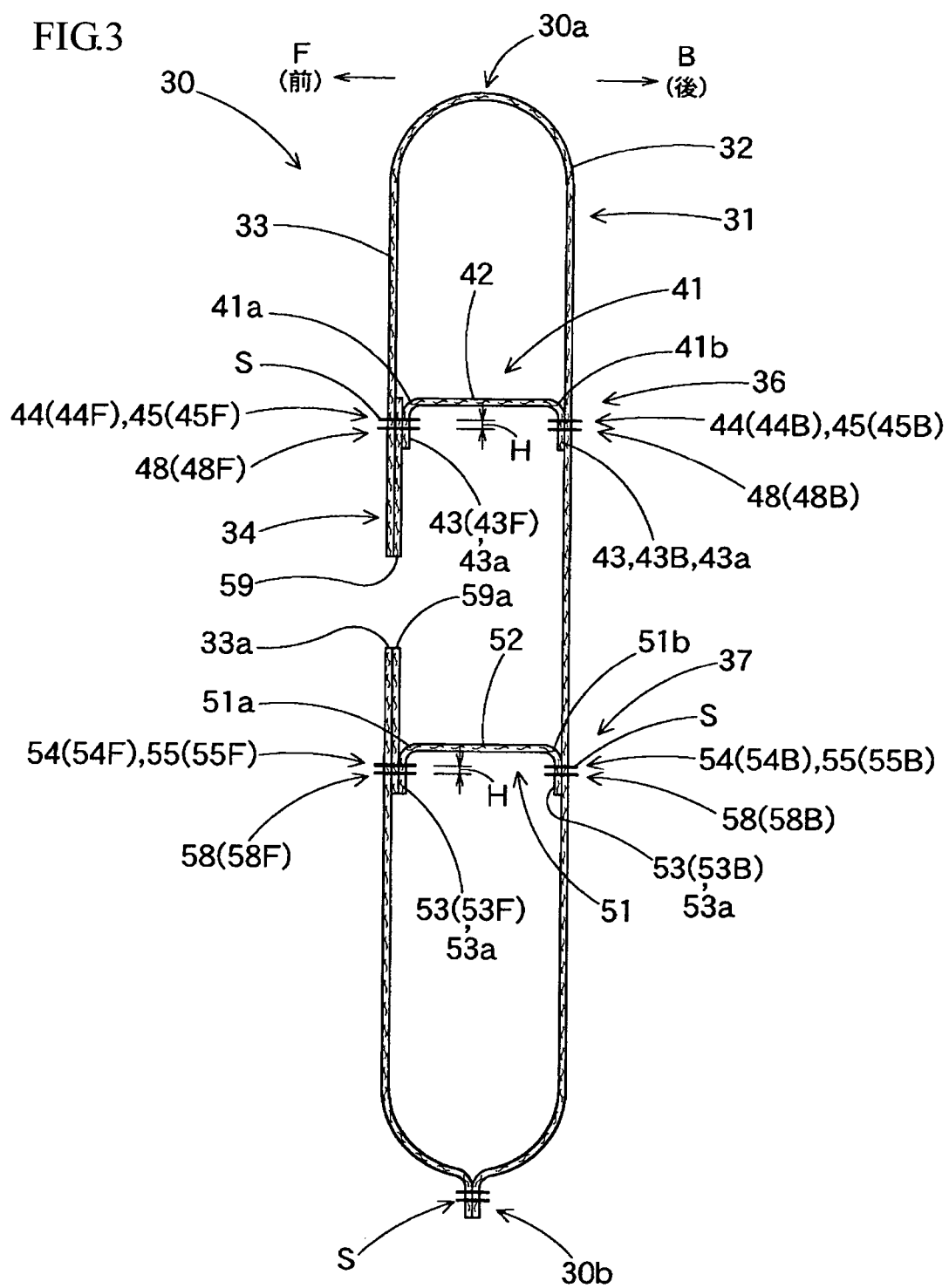
FIG. 3 A vertical sectional view of the air-bag of the embodiment, which corresponds to a portion taken along the line III-III in FIG. 2.
Figure 4:
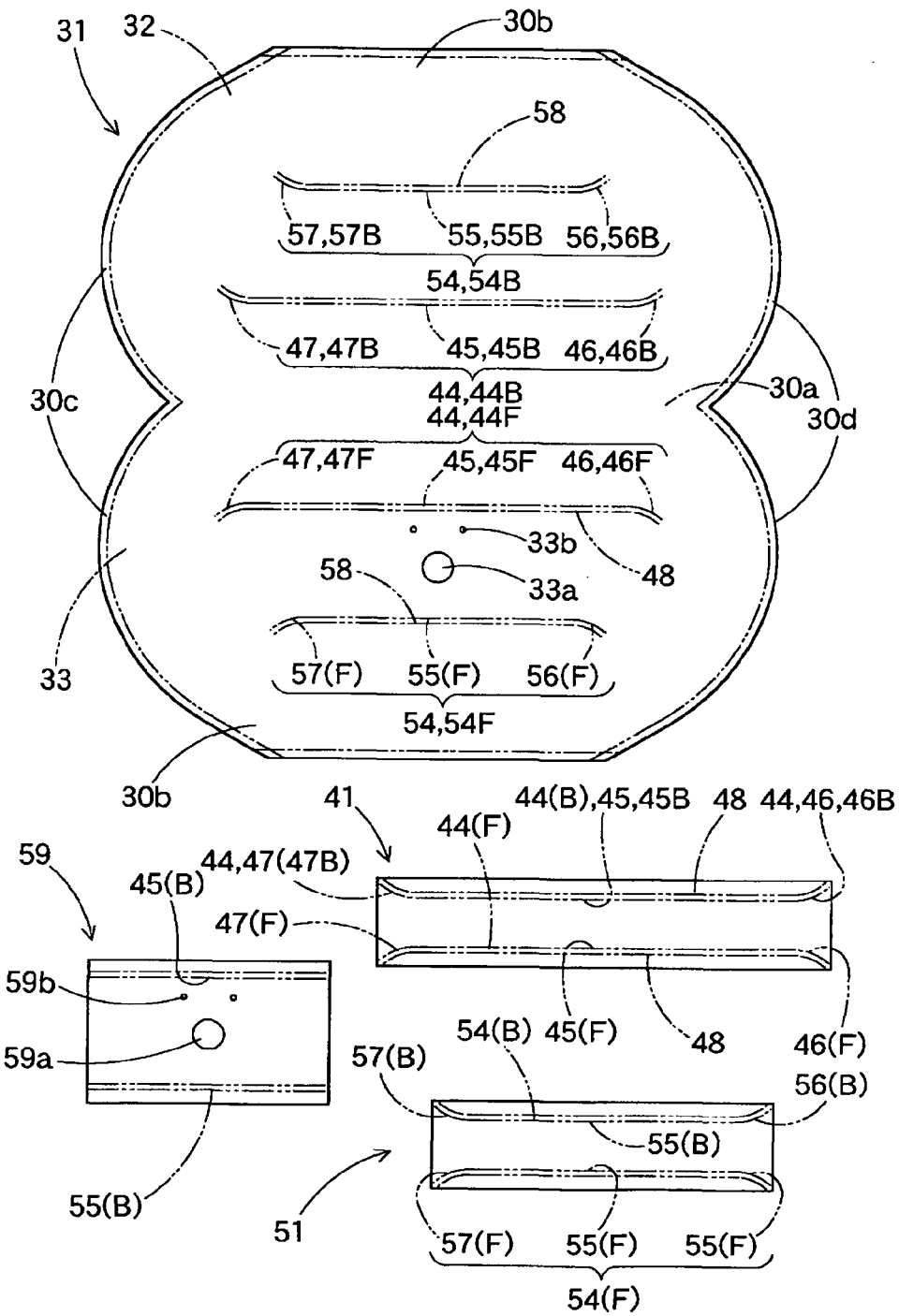
FIG. 4 A front view showing constituent members of the air-bag of the embodiment.

As is indicated by a chain double-dashed line in FIG. 1 and as is shown in FIGS. 2 to 4, the air-bag 30 of the embodiment includes a bag main body 31 which configures a circumferential wall and two tethers 41, 51 which are installed vertically in an interior of the bag main body 31.

The bag main body 31 includes a knee side wall 32 which is one of an opposed walls and lie on the Driver's D side, and a column side wall 33 which is the other of the opposed walls and lie on the column cover 12 side respectively. The knee side wall 32 and the column side wall face each other when the bag main body 31 is inflated completely. The bag main body 31 is inflated completely into a laterally elongated, substantially rectangular plate shape which is elongated in the transverse direction. In the column side wall 33, a circularly opened insertion hole 33a is formed in the vicinity of a center in a vertical direction (or a longitudinal direction when the air-bag 30 is inflated completely while installed in the vehicle) and in a transverse direction of the air-bag 30. Into the insertion hole 33a, the gas discharge port 23a side of the inflator 23 is inserted. Also, through holes 33b through which the bolts 26 of the retainer 25 are caused to project are formed at both left- and right-hand sides on an upper side of the insertion hole 33a in the column side wall 33. The air-bag 30 is fixedly mounted on the ceiling wall portion 18 of the case 17 at circumferential edges of the through holes 33b, 33b of the column side wall 33. The through holes function as a mounting portion 34 together with the inflator 23 in such a way that the respective bolts 26 of the retainer 25 pass through the respective through holes 33b being inserted through the ceiling wall portion 18 of the case 17 so as to be fastened by the corresponding nuts 27 as has been described above.

A reinforcement fabric 59 is sewn to the mounting portion 34 for reinforcing the circumferential edges of the insertion hole 33a and the through holes 33b. An insertion hole 59a through which the inflator 23 is inserted and through holes 59b through which the bolts 26 are passed through are also formed in the reinforcement fabric 59. The positions of the insertion hole 59a and through holes 59b are corresponding to those of the insertion hole 33a and the through holes 33b respectively.

Together with the tethers 41, 51 and the reinforcement fabric 59, the bag main body 31 is formed of a woven fabric such as polyamide or polyether (in the case of the embodiment, a woven fabric of polyamide with a coating layer of polyamide provided thereon). In addition, in the case of the embodiment, as is shown in FIG. 4, the bag main body 31 is formed by folding a piece of woven fabric in which the knee side wall 32 and the column side wall 33 are joined together on an upper edge 30a side of the air-bag 30. The piece of woven fabric is folded so as to be doubled and stitched together at outer circumferential edges of the superposed portions of the woven fabric so folded. The bag main body 31 is not limited to this embodiment and the bag main body 31 may be formed by stitching together separate woven fabrics as required for example.

Portions of the bag main body 31 where the tethers 41, 51 are to be installed are provided in the vicinity of a vertical center between the upper edge 30a and a lower edge 30b of the air-bag 30. The portions are two stages extending along the transverse direction, one of which is at the upper side of the center and the other of which is at the lower side of the center. In these portions, distance controlled portions 36, 37 are defined as such portions where a thickness of the air-bag 30 in the longitudinal direction is set to be constant. Thus, the tethers 41, 51 determine the constant thickness (distance between the facing walls 32,33 in the distance controlled portions 36, 37) as explained in bellows. In the case of the embodiment, the mounting portion 34 is disposed between the distance controlled portions 36, 37 (also can be said between the tethers 41, 51). In other words, the through holes 33b through which the respective bolts 26 of the retainer 25 are inserted and the insertion hole 33a through which the inflator 23 is inserted are disposed between the distance controlled portions 36, 37. Portions defined between left- and right-hand sides of the distance controlled portions 36, 37 and a left edge 30c and a right edge 30d of the air-bag 30 are defined as free inflation portions 39, 39. In the free inflation portions 39,39 the knee side wall 32 and the column side wall 33 are inflated without being controlled by the tethers 41, 51 with respect to the thickness dimension. In the case of the embodiment, the left and right free inflation portions 39, 39 functions as gas flow paths along which the inflation gas discharged from the gas discharge ports 23a of the inflator 23 is caused to flow to both upper and lower sides of the air-bag 30 from between the tethers 41, 51.

As is shown in FIGS. 2 to 6, the upper tether 41 is formed of a strip of woven fabric on which seam margins 43 (43F, 43B) are provided on both front and rear edges of a main body portion 42 which sets a distance T1 (refer to FIG. 6) between the knee side wall 32 and the column side wall 33. In other words, the seam margins 43 are provided on a front edge 41a and a rear edge 41b which face in a thickness direction of the air-bag 30 when the air-bag 30 is inflated completely. Linear stitches 45 (45F, 45B) which extend rectilinearly in the transverse direction are provided at centers in the transverse direction of the seam margins 43, whereby the front edge 41a and the rear edge 41b of the tether 41 are respectively stitched to the knee side wall 32 and the column side wall 33 which are the facing wall portions facing each other. In other words, the upper tether 41 defines distant controlled portions 36, 37 where the distance between the facing wall portions 32, 33 is controlled. In the case of this embodiment, this stitching is implemented by a lock stitch which employs an upper thread SU and a lower thread SD of a stitching thread S. The thread S of this embodiment is made of a polyamide multifilament (refer to an illustration in parentheses). Note that reference characters F and B denote front and rear positions, and reference character F is given to members which are connected to the column side wall 33 which lies in front and reference character B is given to members which are connected to the knee side wall portion 32 which lies in rear.

The tether 41 is stitched to the knee side wall 32 and the column side wall 33 so that curved stitches 46, 47 are provided at a left end portion 43b and a right end portion 43c of the seam margins 43. As is shown in FIG. 6, these curved stitches 46, 47 are formed into curved shapes which extend from left ends 45a and right ends 45b of end portions of the linear stitches 45. The stitching threads S of the linear stitches 45 stretches to the curved stitches 46, 47 so as to gradually expand the distance between the knee side wall 32 and the column side wall 33 which face each other in the direction in which the curved stitches 46, 47 extend to move away from the linear stitches 45 (refer to FIGS. 2, 5). In the case of this embodiment, as seen from a direction which follows the longitudinal direction of the air-bag 30 which is deployed flat, the left and right curved stitches 46, 47 are formed into an arc which has a rectilinear stitching line of the linear stitch 45 as a tangent. Each arc shape is one twelfth of a circle (a sector whose center angle is 30°) which is initiated from ends 46a, 47a which coincide with the left and right ends 45a, 45b of the linear stitches 45 to terminating ends 46b, 47b. With too small a radius R of the arc-like curve, the concentration of stress acting on the stitching threads S, the tether 41 and the like when the air-bag 30 is inflated is made difficult to be mitigated, whereas with too large the radius R thereof, the free inflation portions 39 are narrowed, which is not preferred. Thus, the radius R is desirably set to range approximately from 30 to 120 mm. In the case of this embodiment, the radius R is referred to as 60 mm.

In other words, the curved stitches 46, 47 form gradually expanding portions 50 of the air-bag 30 between the free inflation portion 39 and the distance controlled portions 36, 37. The gradually expanding portion 50 gradually expands in an outward direction perpendicular to the facing wall portions 32, 33.

Figure 5:
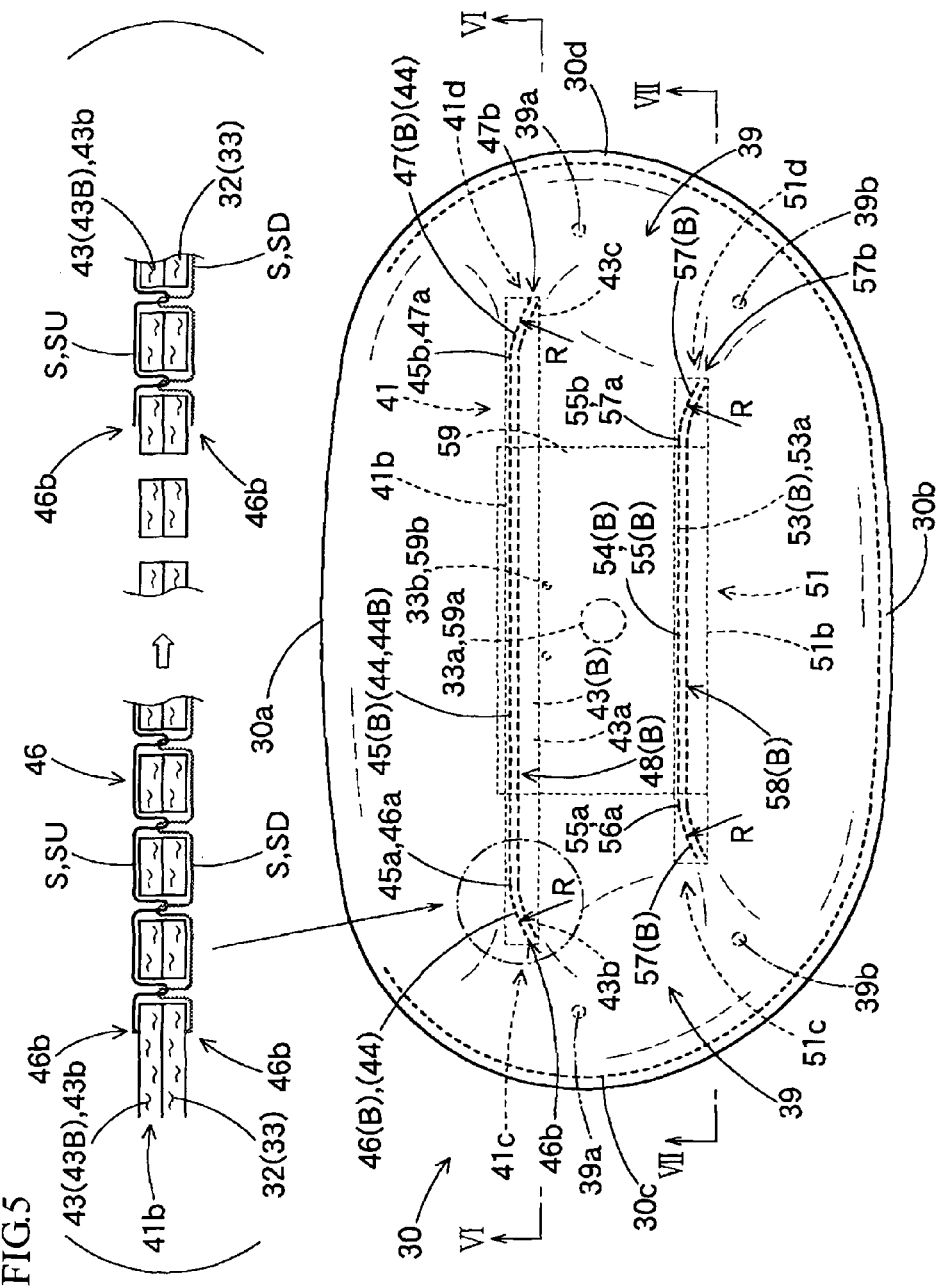
FIG. 5 A front view showing a state of the air-bag of the embodiment alone when the air-bag completes its inflation.
Figure 6:
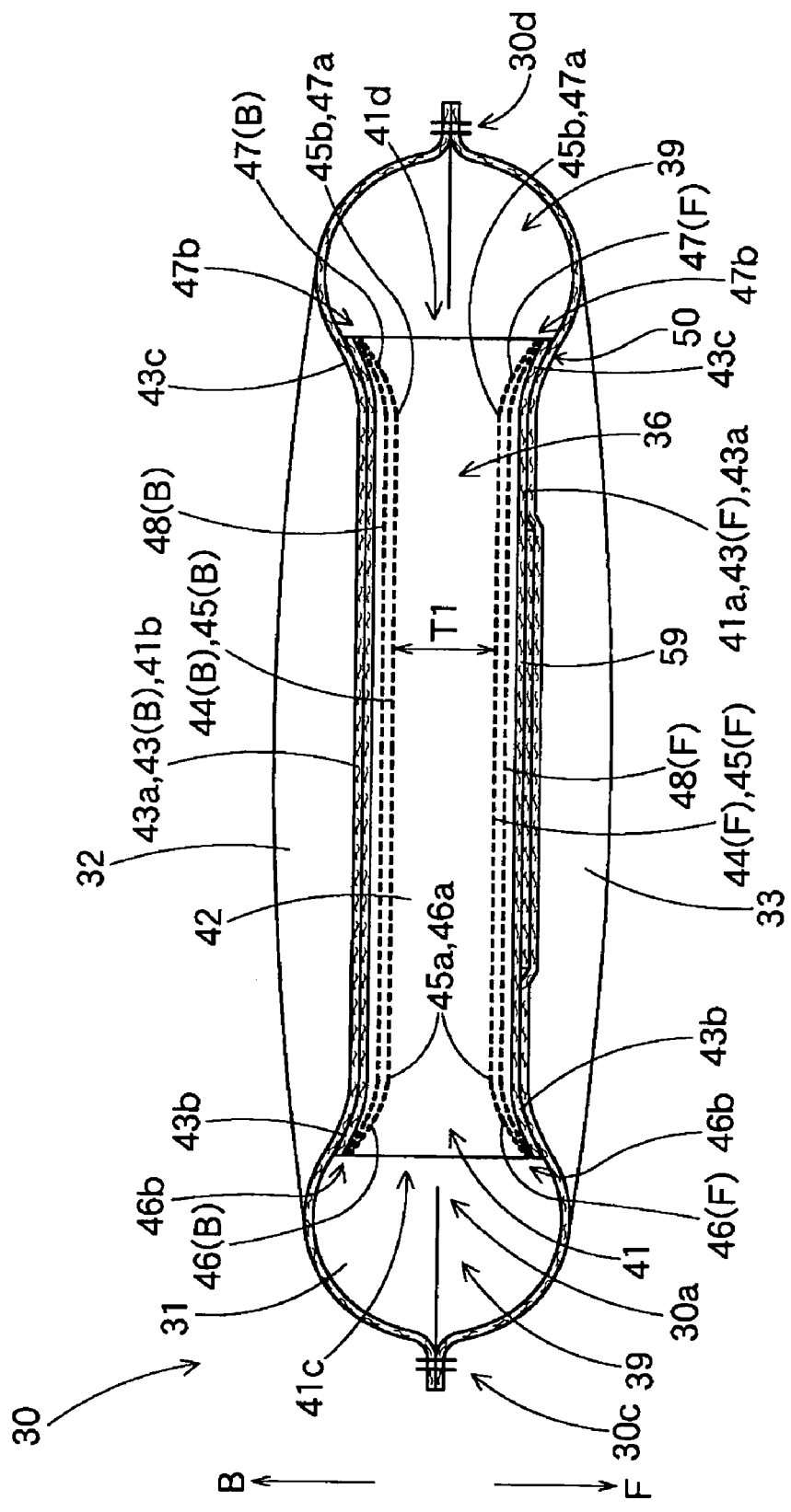
FIG. 6 A horizontal sectional view showing a state of the air-bag of the embodiment alone when the air-bag completes its inflation, which corresponds to a portion taken along the line VI-VI in FIG. 5.
Figure 7:
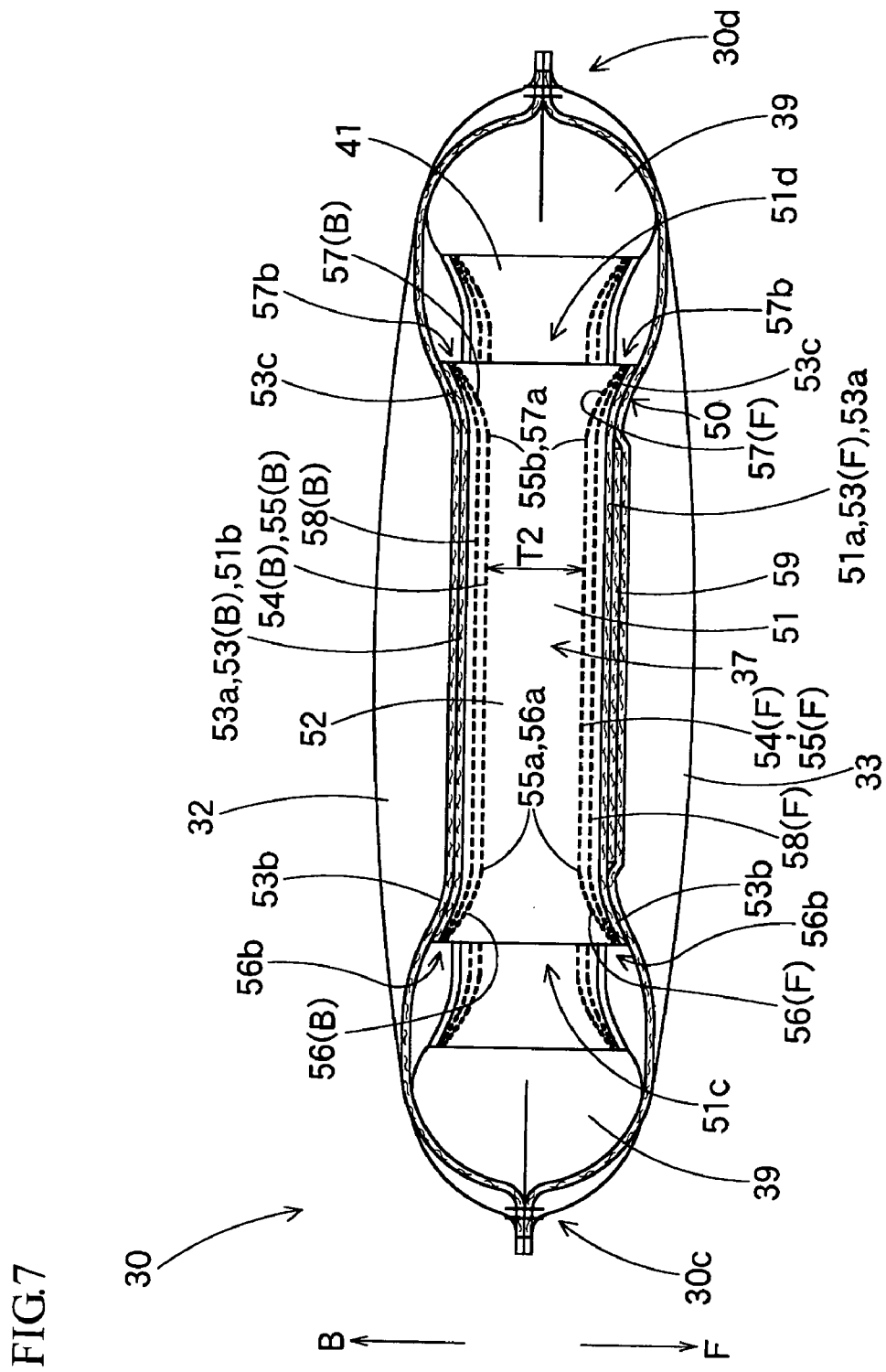
FIG. 7 A horizontal sectional view showing a state of the air-bag of the embodiment alone when the air-bag completes its inflation, which corresponds to a portion taken along the line VII-VII in FIG. 5.

Further, in the case of this embodiment, at the terminating ends 46b, 47b of the curved stitches 46, 47, the upper threads SU and the lower threads SD of the stitching threads S are not reversed but are left unknotted so as to be untied (refer to the illustration in parentheses in FIG. 5). Of course, the tether 41 is stitched to the knee side wall 32 and the column side wall 33 at these curved stitches 46, 47 with a length SL (refer to FIG. 2). This secured length SL can prevent the stitching threads from untied toward the end portions (the left ends 45a and the right ends 45b, in other words, the initiating ends 46a, 47a) of the linear stitches 45 when the air-bag 30 is inflated completely. With too short the length SL, there is a fear that the stitching threads are untied to the end portions of the linear stitches 45, whereas with too long, the stitching threads S are wasted. Thus, the length SL is desirably set to range approximately from 10 to 100 mm, and in the case of this embodiment, the length SL is 20 mm.

Furthermore, in the case of this embodiment, outer stitches 48 are formed at portions of the seam margins 43 which are spaced apart from the main body portion 42 made up of the stitches 44 which include the linear stitches 45 and the curved stitches 46, 47. The outer stitch 48 stitches the seam margins 43 to the knee side wall 32 and the column side wall 33 in parallel to the stitches using the stitching threads S. In the case of this embodiment, a distance H between the stitch 44 and the outer stitch 48 (refer to FIG. 3) is 5 mm.

Similarly, as is shown in FIGS. 2 to 5, and 7, the lower tether 51 is also formed of a strip of woven fabric on which seam margins 53 (53F, 53B) are provided on both front and rear edges of a main body portion 52 which sets a distance T2 (refer to FIG. 7) between the knee side wall 32 and the column side wall 33. In other words, the seam margins 53 are provided on a front edge 51a and a rear edge 51b which face in a thickness direction of the air-bag 30 when the air-bag 30 is inflated completely. In other words, the lower tether 51 also defines distant controlled portions 36, 37 where the distance between the facing wall portions 32, 33 is controlled. Linear stitches 55 (55F, 55B) which extend rectilinearly in the transverse direction are provided at centers in the transverse direction of the seam margins 53, whereby the front edge 51a and the rear edge 51b of the tether 51 are stitched, respectively, to the knee side wall 32 and the column side wall 33 which are the opposed walls facing each other. This stitching is also implemented by a lock stitch which employs an upper thread SU and a lower thread SD of a stitching thread S which is made of a polyamide multifilament.

In the lower tether 51, too, curved stitches 56, 57 are provided at portions of the seam margins which extend from the linear stitches 55 in a direction in which the portions move away from the linear stitches 55, in other words, left end portions 53b and right end portions 53c of the seam margins 53, whereby the tether 51 is stitched to the knee side wall portion 32 and the column side wall portion 33 which face each other. As with the upper tether 41, these curved stitches 56, 57 are also formed into curved shapes which extend from left ends 55a and right ends 55b of end portions of the linear stitches 55 with the stitching threads S of the linear stitches 55 stretched thereto so as to gradually expand the distance between the knee side wall 32 and the column side wall 33 which face each other in the direction in which the curved stitches 56, 57 extend to move away from the linear stitches 55. As with the upper tether 41 described above, as seen from a direction which follows the longitudinal direction of the air-bag 30 which is deployed flat, the left and right curved stitches 56, 57 are also formed into an arc which a rectilinear stitching line of the linear stitch 55 touches as a tangent from initial ends 56a, 57a which coincide with the left ends 55a of the linear stitches 55 to terminating ends 56b, 57b which coincide with the right ends 55b thereof and are specifically formed into a curve which corresponds to one twelfth of a circle (a sector whose center angle is 30°). The radius R of the curves of the curved stitches 56, 57 is also referred to as 60 mm, as with the curved stitches 46, 47. In other words, the curved stitches 56, 57 form gradually expanding portions 50 of the air-bag 30 between the free inflation portion 39 and the distance controlled portions 36, 37. The gradually expanding portion 50 gradually expands in an outward direction perpendicular to the facing wall portions 32, 33.

Further, also at the terminating ends 56b, 57b of the curved stitches 56, 57, the upper threads SU and the lower threads SD of the stitching threads S are not reversed but are left unknotted so as to be untied. Of course, these curved stitches 56, 57 are also formed to secure a length dimension SL (5 mm, in the case of the embodiment) which can prevent the untying of the stitching threads to end portions (left ends 55a and right ends 55b, in other words, initiating ends 56a, 57a) of the linear stitches 55 when the air-bag 30 is inflated completely.

Furthermore, outer stitches 58, which stitch the seam margins 53 to the knee side wall portion 32 and the column side wall portion 33, are formed at portions of the seam margins 53 which are spaced apart from a main body portion 52 made up of stitches 54 which include the linear stitches 55 and the curved stitches 56, 57 with a distance H (5 mm, in the case of the embodiment) provided between the stitches 54 and themselves.

To fabricate the air-bag 30 of this embodiment, firstly, the front edges 41a, 51a sides and the rear edges 41b, 51b sides of the tethers 41, 51 are stitched to the corresponding knee side wall portion 32 and column side wall portion 33 sequentially, so as to form the stitches 44F, 54F on front edges 41a, 51a sides and the outer stitches 48F, 58F, as well as the stitches 44B, 54B on the rear edges 41b, 51b sides and the outer stitches 48B, 58B. When stitching the linear stitches 45F, 55F on the front edges 41a, 51a sides, both upper and lower edges of the reinforcement fabric 59 are stitched together. The insertion holes 33a, 59a and the through holes 33b, 59b are not provided before the reinforcement fabric 59 is stitched but are formed through hole opening operations after the reinforcement fabric 59 is so stitched.

After the tethers 41, 51 have been so stitched to the bag main body 31, outer circumferential edges of the knee side wall portion 32 and the column side wall portion 33 of the bag main body 31 which are folded one on top of the other are stitched together, whereby the air-bag 30 can be fabricated.

The bolts 26, 26 are caused to project from the through holes 33b, 59b and the retainer 25 is installed within the air-bag 30 before the outer circumferential edges of the knee side wall portion 32 and the column side wall portion 33 are stitched together, and the air-bag 30 is then installed in the vehicle.

To describe the installation of the air-bag 30 into the vehicle, firstly, the air-bag 30 is folded. As this occurs, the air-bag 30 is folded so that the width dimensions in the transverse direction and the longitudinal direction are narrowed from a state in which the air-bag 30 is deployed flat. When the folding of the air-bag 30 is completed, the air-bag 30 is wrapped by a predetermined folds collapsing preventive wrapping material so that the collapsing of folds of the folded air-bag 30 is prevented.

With the bolts 26 of the retainer 25 which is now staying within the air-bag 30 inserted into the ceiling wall portion 18 of the case 17, the folded air-bag 30 is interposed between the side walls 20, 21 of the case 17. Following this, the distal gas discharge port 23a side of the inflator 23 is caused to penetrate through the mounting seat 19 and is then inserted into the retainer by way of the insertion holes 33a, 59a in the air-bag 30. The bolts 26 of the retainer 25 are fastened by the corresponding nuts 27 so as to be fastened to the case 17. Then, the mounting portion 34 of the air-bag 30 and the inflator 23 are fixedly attached to the case 17, whereby an air-bag assembly can be fabricated in which the inflator 23 and the air-bag 30 are attached to the case 17.

In installing the air-bag assembly in the vehicle, the lower cover portion 12b is locked on the side walls 20, 21 which extend from the case 17, and the predetermined brackets of the case 17 are fastened to brackets extending from the column tube 5, whereby the air-bag assembly can be fixedly attached to the column tube 5 of the steering column 3. Then, lead wires, not shown, which extend from an air-bag activation circuit are connected to predetermined terminals of the inflator 23, and the upper cover portion 12a of the column cover 12 is fixed to the column tube, whereby the air-bag system M can be installed in the vehicle.

After having been installed in the vehicle, the air-bag system M of the embodiment is activated, and the inflator 23 discharges an inflation gas from the gas discharge ports 23a, whereby the air-bag 30 is inflated. Then, the air-bag 30 push opens the door portions 13, 14 and deploys to inflate while projecting from the projection opening 15 so as to be disposed in front of the left and right knees K of the driver D for protection of the knees K (refer to a chain double-dashed line in FIG. 1).

In the air-bag 30 of the embodiment, even though stress is attempted to concentrate at the left ends 45a, 55a and the right ends 45b, 55b which are the end portions of the linear stitches, the curved stitches 46, 47, 56, 57 are provided at the portions of the seam margins 43, 53 of the tethers 41, 51 which lie at the end portions of the linear stitches 45, 55 with the stitching threads S stretched thereto. These curved stitches 46, 47, 56, 57 are stitched to the knee side wall portion 32 and the column side wall portion 33 in the shapes which are curved from the left ends 45a, 55a and right ends 45b, 55b of the linear stitches 45, 55 so that the distances T1, T2 between the knee side wall portion 32 and the column side wall portion 33 which face each other are gradually expanded in the direction in which the curved stitches extend to move away from the linear stitches 45, 55. Because of this, even though stress is attempted to concentrate at the left ends 45a, 55a and the right ends 45b, 55b of the linear stitches 45, 55, the stress acting on the stitching threads S of the portions where the curved stitches 46, 47, 56, 57 are provided, the left end portions 43b, 53b and the left end portions 43c, 53c of the seam margins 43, 53 of the tethers 41, 51 and the facing wall portions (the knee side wall portions 32 and the column side wall portion 33) is dispersed to be mitigated due to the shapes of the curved stitches in which they are stitched to the knee side wall portion 32 and the column side wall portion 33 in the curvilinear fashion, whereby the occurrence of break or failure of the tethers in the vicinity of the left ends 45a, 55a and the right ends 45b, 55b of the linear stitches 45, 55 can be prevented.

The curved stitches 46, 47, 56, 57 can be formed simply by providing the seam margins 43, 53 (the left end portions 43b, 53b and the right end portions 43c, 53c) on the tethers 41, 51 so as to extend from the left ends 45a, 55a and the right ends 45b, 55b of the linear stitches 45, 55 towards the direction in which the curved stitches move away from the linear stitches 45, 55 and stitching the seam margins while being stretched in the curvilinear fashion from the linear stitches 45, 55, and the stitching work can easily be implemented.

Consequently, in the air-bag 30 of the embodiment, even in a case where the stitching work of the tethers 41, 51 is made simple and easy, the concentration of stress at the left ends 45a, 55a and the right ends 45b, 55b of the linear stitches 45, 55 of the tethers 41, 51 can be mitigated.

In a case in which an air-bag is used as a comparison example in which a reverse stitching in which stitching is reversed towards the center of the linear stitch 45 is applied to the left ends 45a and the right ends 45b of the linear stitches 45, when the air-bag of this comparison example was inflated in a similar way to the embodiment, failures of the tether 41 occurred in the vicinity of the left ends 5a and right ends 45b thereof. However, with the air-bag 30 of the embodiment, such failures and breaks of the stitching threads S did not occur.

Further, in the case of the embodiment, the curved stitches 46, 47, 56, 57 are provided so that the seam margins 43, 53 are stitched to the facing wall portions (the knee side wall portion 32 and the column side wall portion 33) with the length dimension SL secured which can prevent the untying of the stitching threads to the left ends 45a, 55a and the right ends 45b, 55b of the linear stitches 45, 55 when the air-bag is inflated completely and that terminating ends 46b, 47b, 56b, 57b of the stitching threads S which lie on the sides moving away from the linear stitches 45, 55 are not reversed but are cut to be kept unknotted so as to ease the untying of the stitching threads. Because of this, in this embodiment, even though stress is attempted to concentrate at the left ends 45a, 55a and the right ends 45b, 55b of the linear stitches 45, 55 when the air-bag 30 is inflated, the upper threads SU and the lower threads SD of the stitching threads S at the curved stitches 46, 47, 56, 57 are untied to be untangled from the unknotted terminating ends 46b, 47b, 56b, 57b through the seam margins (the left end portions 43b, 53b and the right end portions 43c, 53c of the seam margins 43, 53) of the tethers 41, 51 and the facing wall portions (the knee side wall portion 32 and the column side wall portion 33) (refer to the illustration in the parentheses in FIG. 5), whereby stress like those which call for breaks or failures is not exerted on not only the stitching threads S at the portions at the left ends 45a, 55a and the right ends 45b, 55b of the linear stitches 45, 55 but also the end portions (the left end portions 43b, 53b or the right end portions 43c, 53c) of the seam margins 43, 53 of the tethers 41, 51 which lie at the portions at right ends 45b, 55b or the right ends 45b, 55b of the linear stitches 45, 55 and the facing wall portions (the knee side wall portion 32 or the column side wall portion 33). Further, the stitching threads S are not reversed but are simply cut to be kept unknotted at the curved stitches 46, 47, 56, 57, and this facilitates the stitching work further. Of course, as this occurs, the length dimension SL is set at the curved stitches 46, 47, 56, 57 so as to prevent the untying of the stitching threads S to the end portions (the left ends 45a, 55a and the right ends 45b, 55b) of the linear stitches 45, 55, and the mutual distances T1, T2 between the knee side wall portion 32 and the column side wall portion 33 which the tethers 41, 51 face can be maintained constant by the linear stitches 45, 55.

Incidentally, unless the features described above are taken into consideration, the terminating ends 46b, 47b, 56b, 57b of the stitching threads S may be reversed over a short distance to such an extent that too many labor hours are not spent in the stitching work.

In the case of the embodiment, the curved stitches 46, 47, 56, 57 are provided so as to extend while bent in the arc-like shape and are bent gradually into the curve from the end portions (the left ends 45a, 55a and the right ends 45b, 55b) of the linear stitches 45, 55 towards the sides which move away from the linear stitches 45, 55, whereby the concentration of stress is partially made difficult to act on the respective portions of the curved stitches 46, 47, 56, 57, and the stress attempting to act on the end portions (the left ends 45a, 55a and the right ends 45b, 55b) of the linear stitches 45, 55 can be mitigated by the whole of the arc-shaped curved stitches 46, 47, 56, 57 which stretch to the end portions of the linear stitches 45, 55. Thus, the break or failure of the stitching threads S at the end portions of the linear stitches 45, 55, the seam margins (the left end portions 43b, 53b and the right end portions 43c, 53c) of the tethers 41, 51 and the facing wall portions (the knee side wall portion 32 and the column side wall portion 33) can be prevented further which would otherwise occur when the air-bag 30 is inflated.

Figure 8:
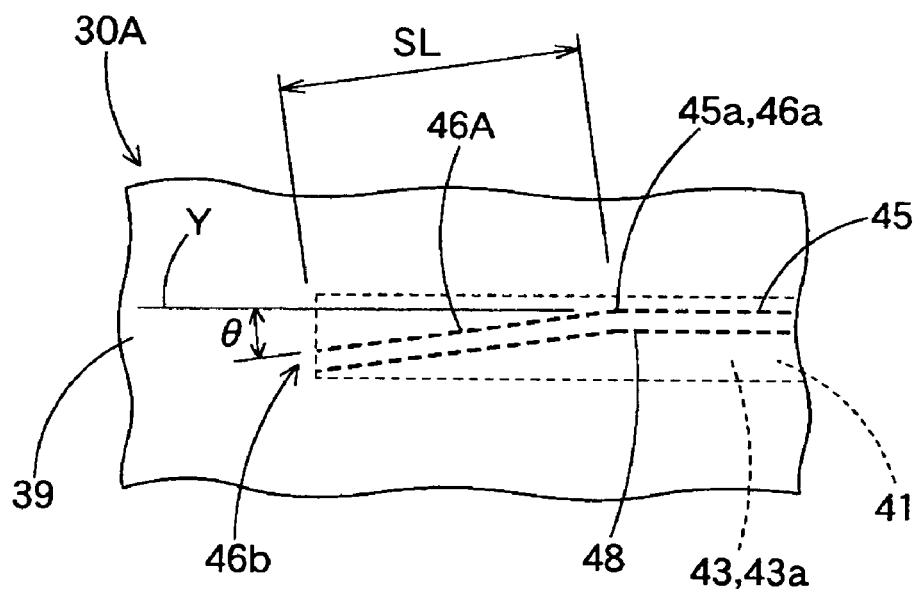
FIG. 8 A view showing an curved stitch of a modified example of the embodiment.

Unless the feature described above is taken into consideration, the curved stitches 46, 47, 56, 57 may be expanded in a tapered fashion from the end portions of the linear stitches 45, 55. As this occurs, as with an air-bag 30A shown in FIG. 8, in a case where an angle θ at which an curved stitch 46A is opened in the tapered fashion from a straight line Y which is extended from a linear stitch 45 is small, stress attempting to concentrate at an end portion (a left end) 45a of the linear stitch 45 can be mitigated. However, in a case where the angle θ is too small, since a length dimension SL of the curved stitch 46A is lengthened to thereby narrow a free inflation portion 39, the curved stitch 46A is desirably such that the angle θ at which the curved stitch 46A is opened from the linear stitch 45 in the tapered fashion ranges approximately from 5 to 20° and that the length dimension SL ranges approximately from 10 to 100 mm.

Figure 9:
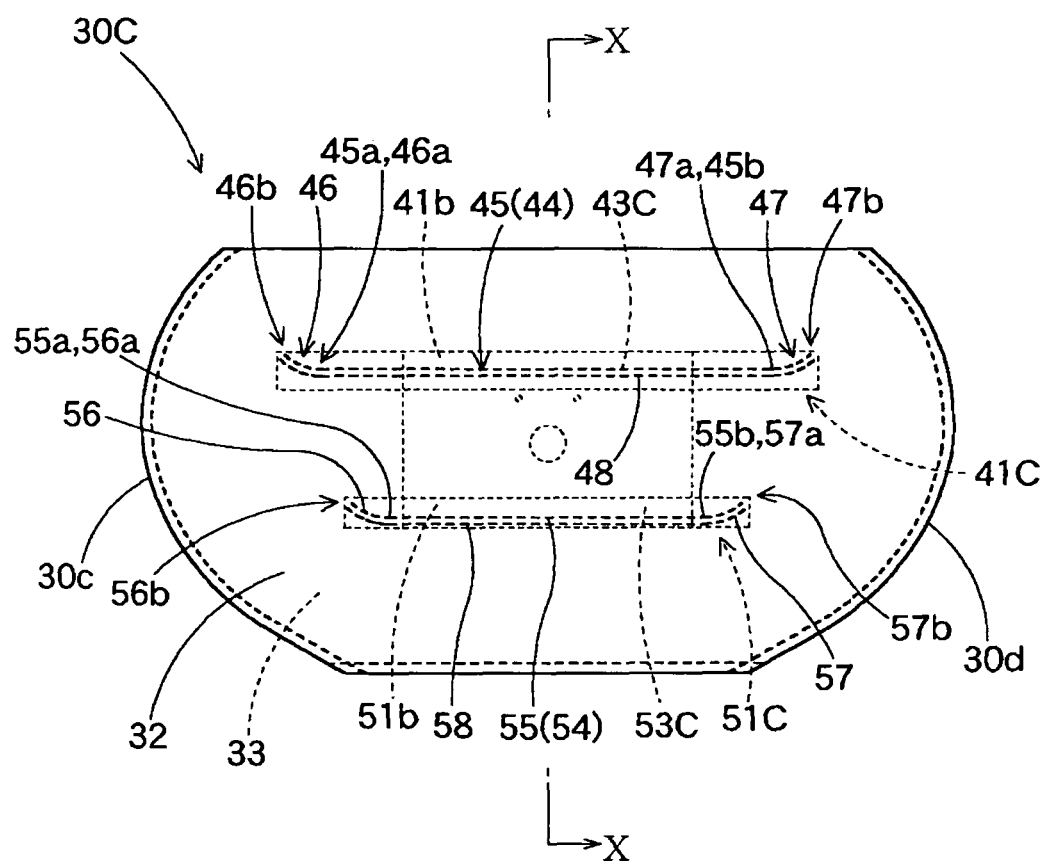
FIG. 9 A view of an air-bag of another modified example of the embodiment viewed from the rear.

Further, in the air-bag 30 of the embodiment, while the seam margins 43, 53 of the tethers 41, 51 are described as being provided so as to be bent downwards from the main body portions 42, 52, as with an air-bag 30C shown in FIGS. 9, 10, in a case in which seam margins 43C, 53C of tethers 41C, 51C are provided so as to be bent upwards from main body portions 42, 52, when the air-bag 30C is seen from the front thereof, curved stitches 46, 47, 56, 57 are provided so as to be curved upwards from linear stitches 45, 55.

Of course, the directions in which they are bent may be caused to differ at seam margins 43F, 43B, 53F, 53B on both edges of the tethers 41, 51. For example, the seam margins 43F, 53F are bent upwards from the main body portions 42, 52, whereas the seam margins 43B, 53B are bent upwards from main body portions 42, 52. In addition, curved stitches 46, 47, 56, 57 may be formed so that a mutual distance between facing wall portions (a column side wall portion 33 and a knee side wall portion 32) is gradually expanded in a direction in which the curved stitches extend to move away from the linear stitches 45, 55.

When the curved stitches are formed into the curves, it is desirable to mitigate the stress concentration on the end portions (the left ends 45a, 55a and the right ends 45b, 55b) of the linear stitches 45, 55 as much as possible and not to control too much the mutual distances of the facing wall portions in the free inflation portions 39. Because of this, when the seam margins 43, 53 are seen from the front thereof, the curved stitches 46, 47, 56, 57 are desirably disposed so that the terminating ends 46b, 56b are disposed further leftwards than the left ends 45a, 55a on the sides of the linear stitches 45, 55 where the curved stitches extend to move away from the linear stitches 45, 55 along the straight lines thereof, that is, on the sides of the linear stitches 45, 55 which lie at the left ends 45a, 55a thereof and on the sides of the linear stitches 45, 55 which lie at the right ends 45b, 55b, the terminating ends 47b, 57b are disposed further rightwards than the right ends 45b, 55b. In addition, the curved stitches 46, 47, 56, 57 are desirably disposed so as to be bent towards apex sides where the thickness dimension of the free inflation portion 39 is increased. In the case of this embodiment, in the curved stitches 46, 47, 56, 57, the extending directions which follow the directions from the initiating ends 46a, 47a, 56a, 57a towards to terminating ends 46b, 47b, 56b, 57b are directed towards the vicinities of apex portions 39a, 39b of the corresponding free inflation portions 39 (refer to FIG. 5).

Further, in the case of the embodiment, the outer stitches 48, 58 are disposed on the peripheries of the stitches 44, 54 which are made up of the linear stitches 45, 55 and the curved stitches 46, 47, 56, 57 so as to be parallel, respectively, to the stitches 44, 54 along the facing wall portions (the knee side wall portion 32 and the column side wall portion) and in such a way that double stitching is implemented using the stitching threads S. Because of this, if the stitching threads S at one of the stitches 44, 54 where the double stitching is implemented should be broken, the stitching threads S of the other outer stitches 48, 58 can control the mutual distances between the facing wall portions (the knee side wall portion 32 and the column side wall portion 33), thereby making it possible to maintain the distances stably. In addition, the tethers 41, 51 and the facing wall portions (the knee side wall portion 32 and the column side wall portion 33) are made integrally into the plate-like shape by the double stitching, whereby the stitching strength can be increased without increasing the tensile strength of the stitching thread S itself.

With respect to the distance H (refer to FIG. 3) between the stitches 44, 54 and the outer stitches 48, 58, the stitches 44, 54 and the outer stitches 48, 58 may be overlapped or superposed on each other partially or totally to such an extent that the tensile strength of the fabrics used for the tethers 41, 51, the knee side wall portion 32 and the column side wall portion 33 is not reduced by stitch holes formed by the stitching threads S. Because of this, the distance H may be in the range of 0 to 20 mm. However, in order to secure a stable tensile strength for the fabrics used for the for the tethers 41, 51, the knee side wall portion 32 and the column side wall portion 33, it is desirable that the distance H between the stitches 44, 54 and the outer stitches 48, 58 be in the range of 3 to 15 mm and that the stitches 44, 54 and the outer stitches 48, 58 are disposed substantially parallel to each other. Incidentally, in the case of the embodiment, as has been described above, the distance H is referred to as 5 mm.

In this embodiment, while the curved stitches 46, 47, 56, 57 are described as being provided on both the tethers 41, 51 which are installed within the air-bag 30, in a case in which the air-bag 30 includes a plurality of tethers 41, 51, in a case where stress concentration exerted on when the air-bag is inflated is easy to be exerted one of the tethers, the curved stitches may be made to be provided only the tether in question.

In the air-bag 30 of the embodiment, the free inflation portions 39 where the facing wall portions (the knee side wall portion 32 and the column side wall portion 33) are spaced apart from each other are described as being provided at both the transverse ends (the left ends 41c, 51c and the right ends 41d, 51d) of the tethers 41, 51 and the curved stitches 46, 47, 56, 57 are described as being provided at both ends (the left ends 45a, 55a and the right ends 45b, 55b) of the linear stitches 45, 55. However, in the event of a construction in which stress concentration is easier to be generated only at one of the ends (the left ends 45a, 55a and the right ends 45b, 55b) of the linear stitches 55, the curved stitches may be provided only at the end portion where the stress concentration is easier to be generated. As a configuration in which the extended stitches are provided only at one of the end portions of the tethers, there is a configuration in which the other end portions of the tethers are not disposed in the free inflation portion but are stitched together on the outer circumferential edge of the circumferential wall of the air-bag, and in the event of such a configuration, the curved stitches may be provided on the free inflation portion sides of the one end portions of the tethers.

Further, in the embodiment, while the curved stitches 46F, 46B, 47F, 47B, 56F, 56B, 57F, 57B are described as being provided on both the edges (the front edges 41a, 51a and the rear edges 41b, 51b) of the respective tethers 41, 51 of the air-bag 30, in a case where stress concentration is easier to be exerted only on the linear stitches 45F, 45B, 55F, 55B on one edge side of the front edges 41a, 51a and the rear edges 41b, 51b, the curved stitches may be provided only on the one edge side of the front edges 41a, 51a and the rear edges 41b, 51b and no curved stitches may not be provided on the other edge side.

In the embodiment, while the air-bag 30 is described as being used in the air-bag system M which is installed in the steering column 3, the invention can be applied to any air-bag, provided that the air-bag includes tethers which are stitched by providing linear stitches so as to control mutual distances between predetermined facing wall portions of the air-bag. Thus, the invention can be applied not only to the knee protection air-bag system M but also to an air-bag for use in a side impact air-bag system which is installed in a seat of a vehicle.

DESCRIPTION OF REFERENCE NUMERALS AND CHARACTERS

30, 30A, 30C air-bag; 31 (circumferential wall) bag main body; 32, 33 facing wall portions (32 knee side wall portion, 33 column side wall portion); 39 free inflation portion; 41, 41c, 51, 51c tether; 43, 53 seam margin; 44, 54 stitch; 45, 55 linear stitch; 45a, 45b, 55a, 55b end portion (of linear stitch); 46, 47, 56, 56A, 57 curved stitch; 48, 58 outer stitch; T1, T2 distance; S stitching thread; M air-bag system

The invention claimed is:

1. An air-bag comprising:
   a circumferential wall including facing wall portions which define a free inflation portion in which a distance between the facing wall portions is not controlled and a distance controlled portion in which a distance between the facing wall portions is controlled; and
   a tether including two edges on each of which a seam margin is provided, both seam margins has a linear stitch which joins the seam margin with the corresponding facing wall portion and controls a distance between the facing wall portions of the distance controlled portion, and at least one of the seam margins has a curved stitch which is continued from an end of the linear stitch and provided at least at one end of the seam margin, wherein
   the curved stitch forms a gradually expanding portion between the free inflation portion and the distance controlled portion, which gradually expands in an outward direction perpendicular to the facing wall portions,
   the linear stitch is stitched in a longitudinal direction of the tether,
   the curved stitch continues from the linear stitch and extends to an end of the curved stitch in a width direction and the longitudinal direction of the tether, and
   the end of the curved stitch is separated and spaced apart from an edge of the air-bag.

2. The air-bag according to claim 1, wherein the curved stitch has enough length so as to prevent the end of the linear stitch from ragged, and the end of the curved stitch is not back stitched.

3. The air-bag according to claim 1, wherein the curved stitch runs in an arc shape continued from the end of the linear stitch.

4. The air-bag according to claim 1, wherein at least one of the seam margins has the curved stitch at both ends thereof.

5. The air-bag according to claim 1, wherein each seam margin has the curved stitch at both ends thereof.

6. The air-bag according to claim 1, wherein the liner stitch and the curved stitch forms a doubled stitch which includes two stitches parallel to each other and running along the corresponding facing wall portion.

\* \* \* \* \*